United States Patent
Yates

(10) Patent No.: US 12,086,871 B2
(45) Date of Patent: Sep. 10, 2024

(54) DIGITAL IMAGING SYSTEMS AND METHODS FOR DETECTING USER-SPECIFIC APPAREL FIT

(71) Applicant: Equanimity Under Duress LLC, Santa Fe, NM (US)

(72) Inventor: Lloyd A. Yates, Chicago, IL (US)

(73) Assignee: Equanimity Under Duress LLC, Santa Fe, NM (US)

( * ) Notice: Subject to any disclaimer, the term of this patent is extended or adjusted under 35 U.S.C. 154(b) by 175 days.

(21) Appl. No.: 17/560,896

(22) Filed: Dec. 23, 2021

(65) Prior Publication Data

US 2023/0206313 A1   Jun. 29, 2023

(51) Int. Cl.
G06Q 30/00      (2023.01)
G06Q 30/0601    (2023.01)
H04N 23/61      (2023.01)

(52) U.S. Cl.
CPC ..... G06Q 30/0643 (2013.01); G06Q 30/0631 (2013.01); H04N 23/61 (2023.01)

(58) Field of Classification Search
None
See application file for complete search history.

(56) References Cited

U.S. PATENT DOCUMENTS

| | | | |
|---|---|---|---|
| 8,660,902 B2 | 2/2014 | Coulter | |
| 9,292,935 B2 * | 3/2016 | Koduri | G06Q 10/0639 |
| 9,648,926 B2 * | 5/2017 | Marks | G06Q 30/0631 |
| 9,721,384 B1 * | 8/2017 | Tran | A43B 17/14 |
| 10,460,525 B1 * | 10/2019 | Buuck | G01F 17/00 |
| 11,563,817 B2 * | 1/2023 | Vasthimal | H04L 51/52 |
| 11,593,871 B1 * | 2/2023 | Haitani | G06F 1/163 |
| 11,755,670 B2 * | 9/2023 | Miller | G06F 16/9535 |
| | | | 707/734 |
| 2006/0020482 A1 | 1/2006 | Coulter | |

(Continued)

FOREIGN PATENT DOCUMENTS

| KR | 10-2010-0048733 A | 5/2010 |
|---|---|---|
| KR | 10-2017-0112267 A | 10/2017 |

(Continued)

OTHER PUBLICATIONS

Edward Shen et al. "Fashion Recommendation and Social Networking based on Commonsense Computing" CHI 2006, Apr. 22-27, 2006, Montreal, Canada (Year: 2006).*

(Continued)

*Primary Examiner* — Naeem U Haq
(74) *Attorney, Agent, or Firm* — MARSHALL, GERSTEIN & BORUN LLP

(57) ABSTRACT

Digital imaging systems and methods are disclosed for detecting user-specific apparel fit. Digital image(s) of a user are obtained that depict one or more portions of the user's body. Apparel fit information is obtained specific to the user. An apparel fit application (app) determines user-specific measurements of one or more portions of the user's body based on the digital image(s). The apparel fit app determines a user-specific fit-based confidence interval for the user based on the user-specific measurements and the apparel fit information. A fit based identification of an apparel item is generated that corresponds to the user-specific fit-based confidence interval.

19 Claims, 8 Drawing Sheets

(56) References Cited

U.S. PATENT DOCUMENTS

| | | |
|---|---|---|
| 2014/0129375 A1 | 5/2014 | Coulter |
| 2016/0063588 A1 | 3/2016 | Gadre et al. |
| 2016/0098777 A1 | 4/2016 | Coulter |
| 2017/0272728 A1* | 9/2017 | Rafii ................ G06Q 30/0631 |
| 2023/0165333 A1* | 6/2023 | Wilcox ................ G06F 3/0482 |
| | | 700/132 |

FOREIGN PATENT DOCUMENTS

| | | |
|---|---|---|
| KR | 101949770 B1 | 2/2019 |
| KR | 10-2020-0085029 A | 7/2020 |

OTHER PUBLICATIONS

International Search Report and Written Opinion, International Application No. PCT/US2022/053504, mailed Apr. 24, 2023.
Trademark Registration No. 6020832, Fit Match®, Graupel Inc. (party), filed Sep. 6, 2019.
International Preliminary Report on Patentability, International Application No. PCT/US2022/053504, mailed Jul. 4, 2024.

* cited by examiner

FIG. 4

DIGITAL IMAGING SYSTEMS AND METHODS FOR DETECTING USER-SPECIFIC APPAREL FIT

FIELD

The present disclosure generally relates to digital imaging systems and methods, and more particularly to, digital imaging systems and methods for detecting user-specific apparel fit.

BACKGROUND

Users are increasingly acquiring apparel items (e.g., clothing) without first trying such apparel items on in a physical environment. Typically, a user will purchase an apparel item via an online store or marketplace for delivery to the user. However, an apparel item's size and dimensions can vary across similar size classifications (e.g., a size "large" in one brand can fit completely different form a size "large" in a different brand). This is especially so when a user has specific fit expectations or preferences.

Accordingly a problem arises when a user acquires an apparel item via an online store or marketplace, but where the apparel item fails to fit the user's specific body dimensions or fit expectations. This problem can lead to waste of real world assets, including fuel, labor, and transportation and shipping services in order to return or replace such apparel items. Existing technologies include online sizing charts, but such charts are typically generalized such that they fail to account for the different shapes and sizes of different human body dimensions, and accordingly provide a false sense of fit and/or dimensioning.

For the foregoing reasons, there is a need for digital imaging systems and methods for detecting user-specific apparel fit, as further described herein.

SUMMARY

Generally, as described herein, digital imaging systems and methods are described for detecting user-specific apparel fit. Such digital imaging systems and methods provide a digital imaging based solution for overcoming problems that arise from correctly identifying apparel fit for specific users, each of which may have various different body dimensions, user preferences, and the like. For example, the digital imaging systems and methods described herein may be used to accurately determine apparel fit specific to the physical characteristics, as determined by digital image processing, specific to a given individual.

The digital imaging systems and methods described herein may be implemented on one or more processors, either of a user computing device (e.g., such as one or more processors of a mobile device or edge device), or one or more processors of remote (cloud-based) computer or server. In some aspects, digital images may be provided to a backend server or cloud platform for image processing. However, in other aspects, image processing could be performed on an edge device.

In one example aspect, an apparel fit application (app) (e.g., which may be referred to herein as the "Tylmen" app) may be downloaded or installed on a user computing device, such as an APPLE IPHONE or GOOGLE ANDORID phone through the APPLE APP store or GOOGLE PLAY store, respectively. A user may open the app to create a user profile. Creation of the profile may include a user providing or selecting preferences, such as sizing preferences (e.g., regular, loose, slim-fit, etc.) In addition, creation of the profile may involve the user scanning himself or herself via a self-recorded video or photograph session. For example, the user can capture or take a 360-degree video to get digital images to generate user-specific measurements (e.g., where a camera is placed on ground and tilted up or otherwise angled toward the user). That is, the self-recorded video or photograph session will allow capture of one or more digital images, each of which can be used to generate or determine one or more body measurements of the user. The digital images may be Red-Green-Blue (RGB) pixel based images and/or may be Light-Detecting-and-Ranging (LiDAR) images, although other two-dimensional (2D) and/or three-dimensional (3D) images may be used, for example, including those described herein.

In various aspects approximately twenty (20) body measurements may be captured. Such body measurements serve as a foundation or basis for the user's sizing profile or otherwise user-specific measurements. In various aspects, user-specific measurements are stored in a backend server and may be accessed by the user on a respective user computing device, e.g., via a profile screen. In some aspects, the server does not store or keep any photos or videos captured by the user, thereby increasing the security and/or reducing the memory requirements of the system as a whole.

Once a user's specific measurements and/or profile information is determined, then the apparel fit app may determine a user-specific fit-based confidence interval (e.g., referred to herein as a "T Fit" or "Your T fit" for a specific user). The user-specific fit-based confidence interval provides one or more confidence intervals for various apparel items, for example, an article of clothing, a pair of shoes, etc.

The user-specific fit-based confidence interval may be displayed via the apparel fit app onto a display screen or graphic user interface (GUI) of a user's computing device.

In some aspects, the apparel fit app may generate a virtual avatar of the user with the apparel item depicted as virtually rendered on the virtual avatar. In this way, the user can virtually try on the specific apparel item to see how it will fit to their specific body dimensions.

In this way, the disclosure of the invention herein can enable online shopping experiences by providing sizing and virtual try-on technology so that users can get an as close as possible to in-person fit or otherwise shopping experiences from the comfort of their home. More importantly, a user can shop online with confidence knowing that the clothing or apparel item(s) they purchase will fit well, and are accurately described as depicted via photographed and 3D renderings. The user may analyze virtual apparel items on their personal virtual avatars that look realistic through via a virtual try-on and GUI based experience.

More specifically, as described herein, a digital imaging method is disclosed for detecting user-specific apparel fit. The digital imaging method comprises obtaining, by one or more processors, one or more digital images of a user. Each of the one or more digital images may depict one or more portions of the user's body. The digital imaging method further comprises obtaining, by the one or more processors, apparel fit information specific to the user. The digital imaging method further comprises determining, by an apparel fit application (app) executing on the one or more processors, user-specific measurements of the one or more portions of the user's body based on the one or more digital images. The digital imaging method further comprises determining, by the apparel fit app, a user-specific fit-based confidence interval for the user. The user-specific fit-based confidence interval may be based on the user-specific measurements and the apparel fit information. The digital imaging method further comprises generating a fit based identification of an apparel item that corresponds to the user-specific fit-based confidence interval.

In addition, as described herein, a digital imaging system is disclosed. The digital imaging system is configured to detect user-specific apparel fit. The digital imaging system comprises an apparel fit application (app) comprising computing instructions configured to execute on the one or more processors. The computing instructions of the apparel fit app when executed by the one or more processors, cause the one or more processors to obtain one or more digital images of a user. Each of the one or more digital images may depict one or more portions of the user's body. The computing instructions of the apparel fit app when executed by the one or more processors, may further cause the one or more processors to obtain apparel fit information specific to the user. The computing instructions of the apparel fit app when executed by the one or more processors, may further cause the one or more processors to determine user-specific measurements of the one or more portions of the user's body based on the one or more digital images. The computing instructions of the apparel fit app when executed by the one or more processors, may further cause the one or more processors to determine a user-specific fit-based confidence interval for the user. The user-specific fit-based confidence interval may be based on the user-specific measurements and the apparel fit information. The computing instructions of the apparel fit app when executed by the one or more processors, may further cause the one or more processors to generate a fit based identification of an apparel item that corresponds to the user-specific fit-based confidence interval.

Further, as described herein, a tangible, non-transitory computer-readable medium storing instructions for detecting user-specific apparel fit is disclosed. The instructions, when executed by one or more processors, may cause the one or more processors to obtain one or more digital images of a user. Each of the one or more digital images may depict one or more portions of the user's body. The instructions, when executed by one or more processors, may further cause the one or more processors to obtain apparel fit information specific to the user. The instructions, when executed by one or more processors, may further cause the one or more processors to determine user-specific measurements of the one or more portions of the user's body based on the one or more digital images. The instructions, when executed by one or more processors, may further cause the one or more processors to determine a user-specific fit-based confidence interval for the user. The user-specific fit-based confidence interval may be based on the user-specific measurements and the apparel fit information. The instructions, when executed by one or more processors, may further cause the one or more processors to generate a fit based identification of an apparel item that corresponds to the user-specific fit-based confidence interval.

The present disclosure relates to improvements to other technologies or technical fields at least because the present disclosure describes or introduces improvements to computing devices in the digital image processing field, whereby the digital imaging systems and methods execute on computing devices and improves the field of digital imaging, with digital based analysis of digital images of one or more digital images of a user and implementing dimensioning of such users in order to determine user-specific measurements and apparel fit. Such systems and methods are configured to operate using a reduced processing and/or memory, and thus can operate on limited compute and memory devices, including mobile devices. For example, digital images of user (typically amounting in several megabytes or gigabytes of data) may be discarded or reduced after the user-specific measurements are generated. Such reduction frees up the computational resources of an underlying computing system, thereby making it more efficient.

Still further, the present disclosure relates to improvement to other technologies or technical fields at least because the present disclosure describes or introduces improvements to computing devices in the field of security and/or image processing, where, at least in some aspects, images of users may be preprocessed (e.g., cropped, blurred, obscured or otherwise modified) to determine user-specific measurements a user without depicting personal identifiable information (PII) of the user (e.g., such as private areas of the user). Additionally, or alternatively, by using a virtual avatar, as described herein, a user's data can be completely abstracted from any detailed PII as shown in an original image (e.g., surface textures, skin color, birthmarks, etc. all disappear). Such features provide a security improvement, i.e., where the removal of PII (e.g., private area features) provides an improvement over prior systems because cropped or redacted images, especially ones that may be transmitted over a network (e.g., the Internet), are more secure without including PII information of an individual. Accordingly, the systems and methods described herein operate without the need for such essential information, which provides an improvement, e.g., a security improvement, over prior systems. In addition, the use of cropped, modified, or obscured images, at least in some aspects, allows the underlying system to store and/or process smaller data size images, which results in a performance increase to the underlying system as a whole because the smaller data size images require less storage memory and/or processing resources to store, process, and/or otherwise manipulate by the underlying computer system. For example, a server or other computing device need not store or keep any photos or videos taken in this digital image capture process which can thereby increase the security of the digital imaging system by removing sensitive information. For the same reason, the underlying digital imaging system is improved whereby the storage or memory resources used by the digital imaging system is condensed to the user-specific measurements (which is mere kilobytes of data for a given user) without the need to store related digital images (which would require several megabytes (MB) or gigabytes (GB) of data).

In addition, the present disclosure includes specific features other than what is well-understood, routine, conventional activity in the field, and that add unconventional steps that confine the claim to a particular useful application, e.g., digital imaging systems and methods for detecting user-specific apparel fit.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 4 illustrates an example graphic user interface (GUI) as rendered on a display screen of a user computing device regarding apparel fit information in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

The present disclosure relates to digital imaging systems and methods for detecting user-specific apparel fit. Such systems and methods comprise analyzing or scanning a user's body in order to obtain digital images that are then used to generate a fit based identification of an apparel item (e.g., a garment such as a shirt, etc.) that corresponds to a user-specific recommendation for the user. The digital images may be used to determine a user's specific size and dimensions based on the processing of one or more digital images of the user to determine the physical attributes of the intended wearer of the apparel item.

Generally, user-specific measurements of the one or more portions of the user's body may be determined from one or more digital images of a user (e.g., digital image 202a as describe herein). In some aspects, the digital images may be two-dimensional (2D). Additionally, or alternatively, the digital images may be three-dimensional (3D) or contain three dimensional data. The digital images may additionally or alternatively comprise 2D and/or 3D scans (e.g., where a computing includes a scanning function or capability), comprising respective 2D and/or 3D data of such scans. In various aspects, the digital image(s) (e.g., digital 202a) may comprise various data types and/or formats as captured by various 2D and/or 3D imaging capture systems or cameras, including, by way of non-limiting example, light-detecting-and-ranging (LiDAR) based digital images, time-of-flight (ToF) based digital images, other similar types of images as captured by 2D and/or 3D imaging capture systems and/or cameras. Compared to LiDAR, typical implementations of ToF image analysis involves a similar, but different, creation "depth maps" based on light detection, usually through a standard RGB camera. With respect to the disclosure herein, LiDAR, ToF, and/or other 3D imaging techniques are compatible, and may each, together or alone, be used with, the disclosure and/or aspects herein. In various aspects, such digital images may be saved or stored in formats, including, but not limited to, e.g., JPG, TIFF, GIF, BMP, PNG, and/or other files, data types, and/or formats for saving or storing such images.

In addition, such digital images may comprise color and/or channel data, including by way of non-limiting example, red-green-blue (RGB) data, CIELAB (LAB) data, hue saturation value (HSV) data, and/or or other color formats and/channels. Such digital images may be captured, stored, processed, analyzed, and/or otherwise manipulated and used as described herein, by apparel fit application, digital imaging system 100, or otherwise as described herein.

Figure 1:
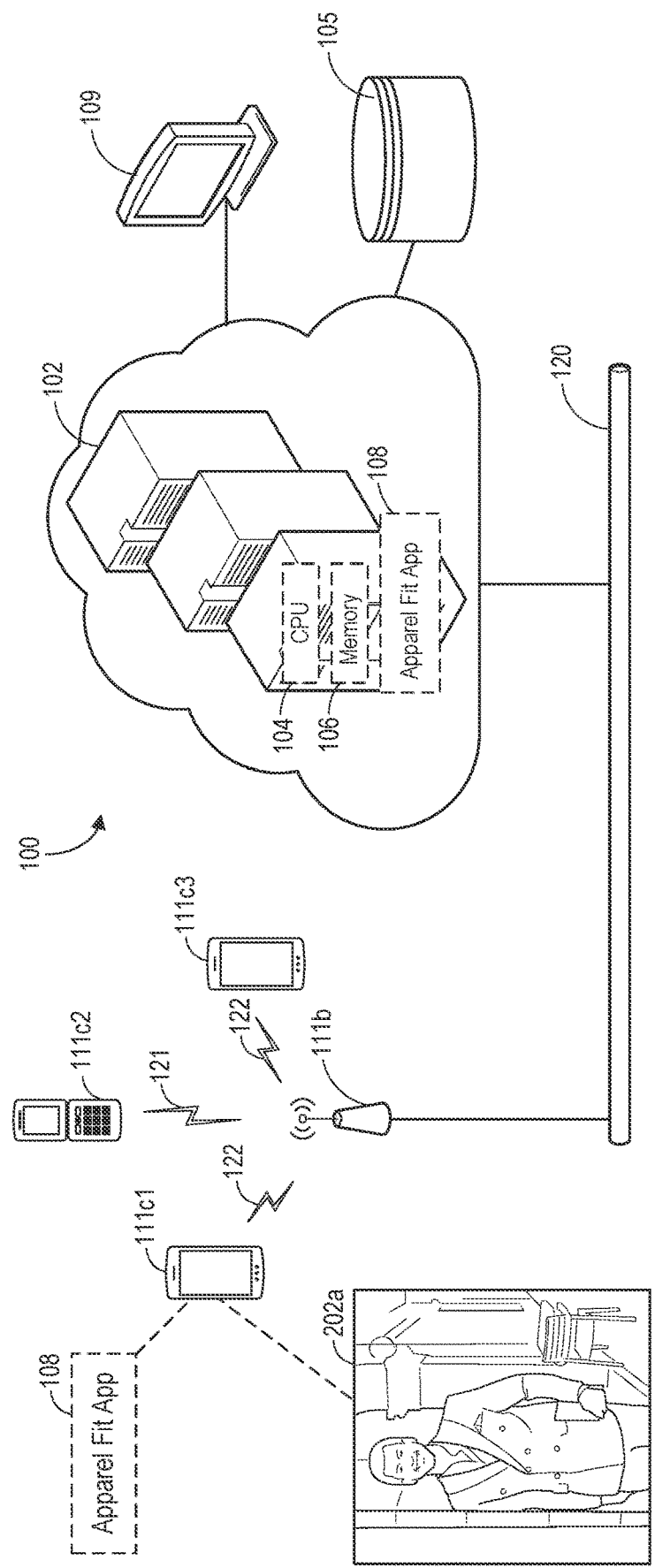
FIG. 1 illustrates an example digital imaging system configured to detect user-specific apparel fit, in accordance with various aspects disclosed herein.

FIG. 1 illustrates an example digital imaging system 100 configured to detect user-specific apparel fit, in accordance with various aspects disclosed herein. In the example aspect of FIG. 1, digital imaging system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server(s) 102 may include one or more processor(s) 104 as well as one or more computer memories 106. In various aspects, server(s) 102 may be referred to herein as "imaging server(s)."

Memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 106 may store an operating system (OS) (e.g., Microsoft Windows, Linux, UNIX, etc.) capable of facilitating the functionalities, apps, methods, or other software as discussed herein. Memorie(s) 106 may also store an apparel fit application (app) 108, a remote app, for capturing and/or analyzing digital images (e.g., digital image 202a), as described herein. Additionally, or alternatively, digital images, such as digital image 202a, may also be stored in database 105, which is accessible or otherwise communicatively coupled to imaging server(s) 102. In addition, memories 106 may also store machine readable instructions, including any of one or more application(s) (e.g., an imaging application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 104. It should be appreciated that given the state of advancements of mobile computing devices, all of the processes functions and steps described herein may be present together on a mobile computing device (e.g., user computing device 111c1).

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, digital images (e.g., digital image 202a), user-specific measurements, user profile information, and/or other images and/or information such as or the like, or as otherwise described herein.

Imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to terminal 109. According to some aspects, an administrator or operator may access the server 102 via terminal 109 to review information, make changes, and/or perform other functions as described herein.

In some aspects, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the app or computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111c1-111c3 via base station 111b. In some aspects, base station 111b comprise a cellular base station, such as a cell tower, communicating to the one or more user computing devices 111c1-111c3 via wireless communications 121 based on any one or more of various mobile phone standards, including NMT, GSM, CDMA, UMMTS, LTE, 5G, or the like. Additionally, or alternatively, base stations 111b may comprise routers, wireless switches, or other such wireless connection points communicating to the one or more user computing devices 111c1-111c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 may comprise mobile devices and/or client devices for accessing and/or communications with imaging server(s) 102. Such mobile devices may comprise one or more mobile processor(s) and/or an imaging device for capturing images, such as images as described herein (e.g., digital image 202a). In various aspects, user computing devices 111c1-111c3 may comprise a mobile phone (e.g., a cellular phone), a tablet device, a personal data assistance (PDA), or the like, including, by non-limiting example, an APPLE IPHONE or IPAD device or a GOOGLE ANDROID based mobile phone or tablet.

In various aspects, the one or more user computing devices 111c1-111c3 may implement or execute an operating system (OS) or mobile platform such as APPLE iOS and/or Google ANDROID operation system. Any of the one or more user computing devices 111c1-111c3 may comprise one or more processors and/or one or more memories for storing, implementing, or executing computing instructions or code, e.g., a mobile application, as described in various aspects herein. As shown in FIG. 1, apparel fit app 108 and/or an imaging application (e.g., as described herein), or at least portions thereof, may also be stored locally on a memory of a user computing device (e.g., user computing device 111c1).

User computing devices 111c1-111c3 may comprise a wireless transceiver to receive and transmit wireless communications 121 and/or 122 to and from base station 111b. In various aspects, digital images (e.g., digital image 202a) may be transmitted via computer network 120 to imaging server(s) 102 for imaging analysis as described herein.

In addition, the one or more user computing devices 111c1-111c3 may include a digital camera, digital video camera, and/or otherwise imaging capture device or system for capturing or taking digital images and/or frames (e.g., digital image 202a). Each digital image may comprise LiDAR, ToF, and/or pixel data, which may be used for imaging analysis as described herein. For example, a digital camera and/or digital video camera of, e.g., any of user computing devices 111c1-111c3 may be configured to take, capture, or otherwise generate digital images (e.g., digital image 202a) and, at least in some aspects, may store such images in a memory of a respective user computing devices. Additionally, or alternatively, such digital images may also be transmitted to and/or stored on memorie(s) 106 and/or database 105 of server(s) 102.

Still further, each of the one or more user computer devices 111c1-111c3 may include a display screen for displaying graphics, images, text, dimension(s), apparel items, virtual avatars, data, pixels, features, and/or other such visualizations or information as described herein. In various aspects, graphics, images, text, dimension(s), product sizes, data, pixels, features, and/or other such visualizations or information may be received from imaging server(s) 102 for display on the display screen of any one or more of user computer devices 111c1-111c3. Additionally, or alternatively, a user computer device may comprise, implement, have access to, render, or otherwise expose, at least in part, an interface or a graphic user interface (GUI) for displaying text and/or images on its display screen. In various aspects, a display screen can also be used for providing information, instructions, and/or guidance to the user of a given device (e.g., user computing device 111c1).

In some aspects, computing instructions and/or applications executing at the server (e.g., server(s) 102) and/or at a mobile device (e.g., mobile device 111c1) may be communicatively connected for analyzing LiDAR data, ToF data, and/or pixel data of one or more digital images depicting users and/or related user-specific measurements, as described herein. For example, one or more processors (e.g., processor(s) 104) of server(s) 102 may be communicatively coupled to a mobile device via a computer network (e.g., computer network 120). In such aspects, an apparel fit app may comprise a server app portion configured to execute on the one or more processors of the server (e.g., server(s) 102) and a mobile app portion configured to execute on one or more processors of the mobile device (e.g., any of one or more user computing devices 111c1-111c3) and/or other such standalone imaging device. In such aspects, the server app portion is configured to communicate with the mobile app portion. The server app portion or the mobile app portion may each be configured to implement, or partially implement, one or more of: (1) obtaining, by one or more processors, one or more digital images (e.g., digital image 202a) of a user, each of the one or more digital images depicting one or more portions of the user's body; (2) obtaining, by the one or more processors, apparel fit information specific to the user; (3) determining, by one or more processors, user-specific measurements of the one or more portions of the user's body based on the one or more digital images; (4) determining, by the one or more processors, a user-specific fit-based confidence interval for the user, the user-specific fit-based confidence interval based on the user-specific measurements and the apparel fit information; and (5) generating a fit based identification of an apparel item that corresponds to the user-specific fit-based confidence interval.

Figure 2:
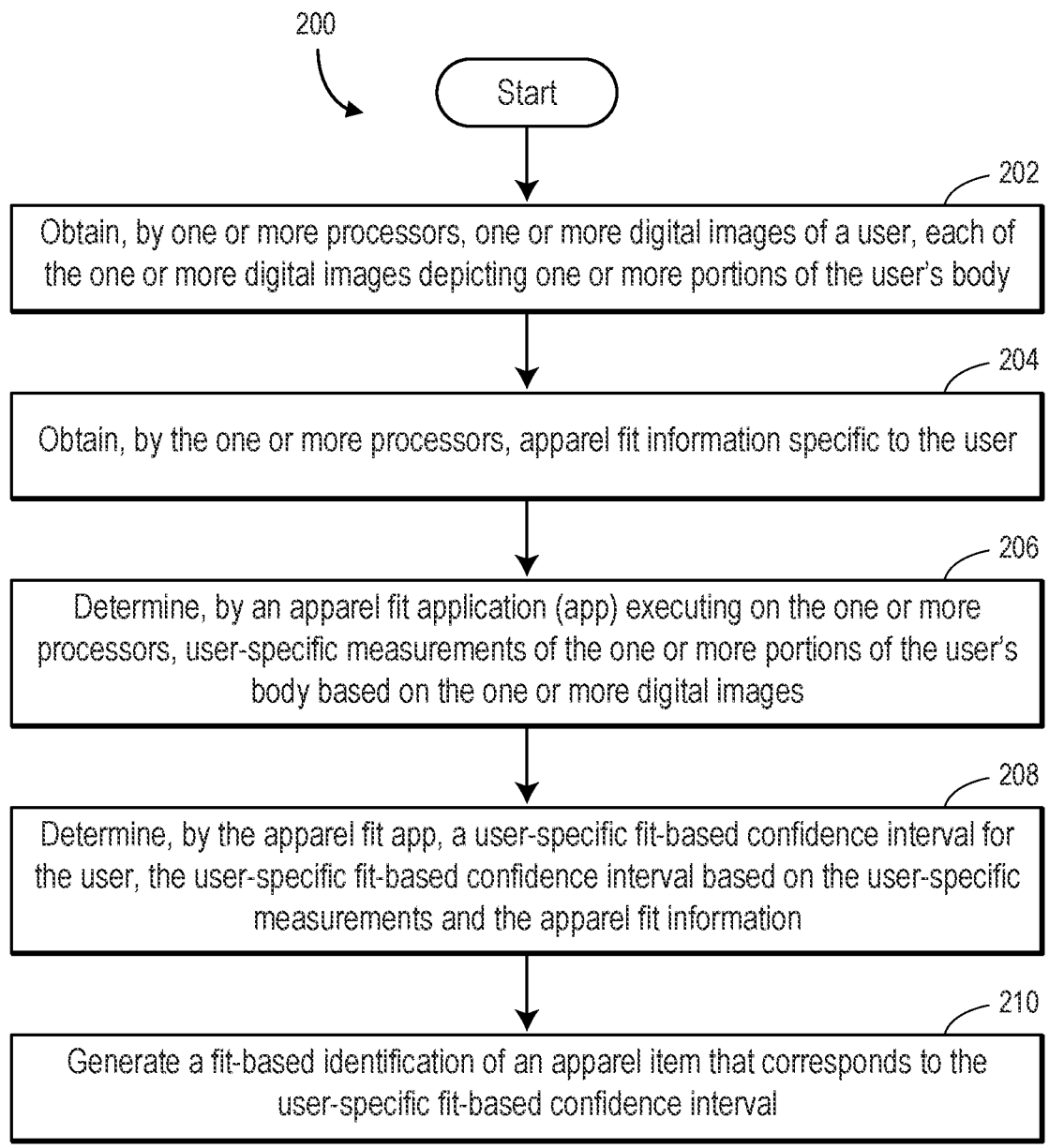
FIG. 2 illustrates an example digital imaging method for detecting user-specific apparel fit, in accordance with various aspects disclosed herein.

FIG. 2 illustrates an example digital imaging method 200 for detecting user-specific apparel fit, in accordance with various aspects disclosed herein. At block 202, digital imaging method 200 comprises obtaining, by one or more processors (e.g., such as a processor of user computing device 111c1), one or more digital images (e.g., such as a self-recorded video) of a user. Each of the one or more digital images may depict one or more portions of the user's body.

For example, in various aspects, apparel fit app, executing on one or more processors of a user computing device 111c1, can capture or scan a user to obtain a recorded video or one or more digital images of the user (e.g., digital image 202a). The digital image(s) may then be used to generate body measurements (e.g., for example, approximately 20 measurements as shown for FIG. 3 herein). In various aspects, the server (e.g., server 102) need not store or keep any photos or videos taken in this digital image capture process. By implementing this aspect, the security of the digital imaging system is increased by avoiding storage of sensitive user information. For the same reason, the underlying digital imaging system is improved whereby the storage or memory resources used by the digital imaging system is condensed to the user-specific measurements (which is mere kilobytes of data for a given user) without the need to store related digital images (which would require several megabytes (MB) or gigabytes (GB) of data per user).

With further reference to FIG. 2, at block 204, digital imaging method 200 further comprises obtaining, by the one or more processors, apparel fit information specific to the user. Apparel fit information may comprise weight and height information specific to the user, as well as user preferences, although it is to be understood that other information may comprise apparel fit information of a user. For example, in various aspects, apparel fit app can request that a user create profile, where the user inputs information regarding his or her body dimensions, preferences, and the like. Apparel fit information is further described herein with respect to FIG. 4.

Figure 3:
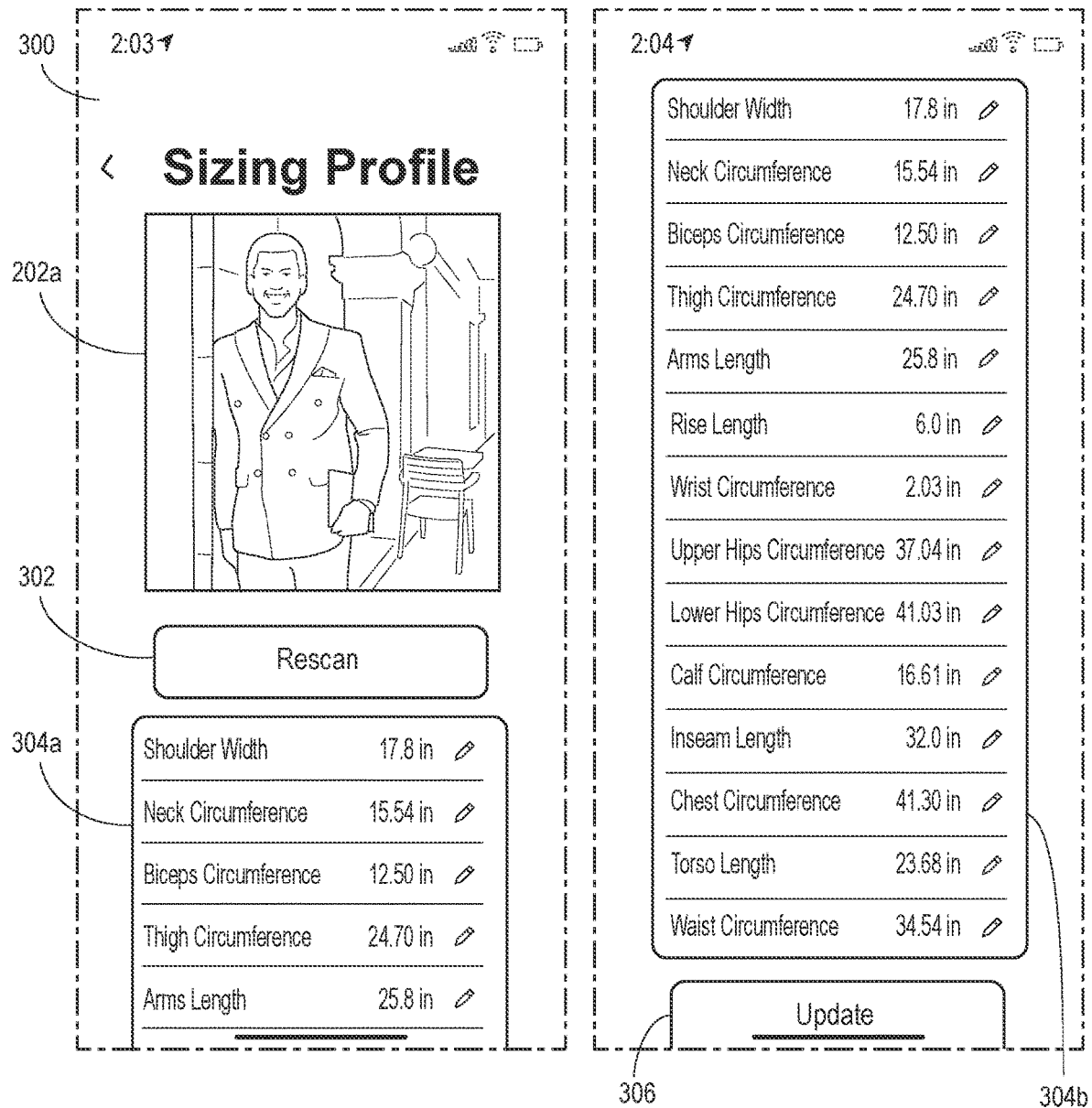
FIG. 3 illustrates an example graphic user interface (GUI) as rendered on a display screen of a user computing device regarding user-specific measurements in accordance with various aspects disclosed herein.

At block 206, digital imaging method 200 further comprises determining, by the apparel fit app, executing on the one or more processors (e.g., one or more processors of user computing device 111c1 and/or server 102), user-specific measurements of the one or more portions of the user's body based on the one or more digital images (e.g., digital image 202a). Such body measurements may be used to generate or otherwise determine a user's sizing profile or user-specific measurements. In some aspects, such the user's sizing profile or user-specific measurements may be stored in a backend server (e.g., server 102), and may be accessible to the user via the apparel fit app, for example, via their profile view as illustrated by FIG. 3 herein. The sizing profile (e.g., comprising user-specific measurements) are described further herein for FIG. 3.

In some aspects, a user profile of the user may be generated for the user. The user profile may include or otherwise be based on one or more digital images as captured for the user, apparel fit information of the user, or other user-specific information as described herein. For example, the apparel fit app can request a user to create a profile, involving the user to scan himself or herself through a self-recorded video and/or digital imaging. In one aspect, as described for FIG. 3, such scanning can generate approximately 20 body measurements, which can serve as the foundation to a user's sizing profile. This information can be incorporated into the user's profile along with other information as provided by the user or as determined for the user via the apparel fit app based on the digital images.

In some aspects, a user may initiate electronic transmission of the user profile to a second user. The user profile may, for example be transmitted from the apparel fit app and/or from the server(s) (e.g., server 102) where it is stored. Once received, the user profile allows a second user to identify apparel for the user based on the user's profile. This allows sharing the user profile with friends, family, and/or otherwise a third-party user. That is, in such aspects, each user is able to share and store sizing profiles of their friends, family, and significant others on the app and/or servers, allowing loved ones to know exact sizing and measurements for the user when purchasing apparel items for the user. In addition, a user may have have multiple user profiles defining different sizing profiles or otherwise user-specific measurements. The user then may share a specific user profile which allows the user to provide friends and family with confidence and knowledge of the user's exact size and fit for a specific user profile.

With further reference to FIG. 2, at block 208, digital imaging method 200 further comprises determining, by the apparel fit app, a user-specific fit-based confidence interval for the user. The user-specific fit-based confidence interval may also be referred to as a user's "T Fit." In various aspects, the user-specific fit-based confidence interval is based on the user-specific measurements and the apparel fit information. In various aspects, the user-specific fit-based confidence interval provides percentile classifications or indications that can represent a multitude of preferential fits. For example, a user may have a preference for loose upper garments and tight lower garments. In such cases, a confidence interval can be mapped to the user's unique preferences or specifications entailing those specific fit preferences. This granularity provides the user with additional fit options or classifications as opposed to a general range of sizes which does not take intervals fitting into consideration. In this way, the user-specific fit-based confidence interval fit has the capacity to be highly specific and catered to the user's needs, wants, and intricacies. Aspects of the user-specific fit-based confidence interval are further described herein with respect to FIG. 6.

At block 210, digital imaging method 200 further comprises generating a fit based identification of an apparel item that corresponds to the user-specific fit-based confidence interval. An apparel item can be, by way of non-limiting example, clothing, garments, shoes, hats, belts, or otherwise any wearable item. In some aspects, the apparel item as identified is based on a search for an apparel item type. In this way, a user can use a search feature of the apparel fit app to search for specific clothes, garments, brands and/or other related apparel items or articles. For example, if a user searches for the brand "Ben X Til," or even part of the name "Ben," then products from the vendor of the "Ben X Til" brand may be displayed in search results. This applies for any brand or article of clothing a user searches. Each of the products shown based on the search may have displayed therewith, on a GUI of the user computing device, a user-specific fit-based confidence interval, i.e., the user's "T Fit," as further described herein with respect to FIG. 6.

FIG. 3 illustrates an example graphic user interface (GUI) as rendered on a display screen 300 of a user computing device (e.g., user computing device 111c1) regarding user-specific measurements in accordance with various aspects disclosed herein. For example, as shown in the example of FIG. 3, GUI 300 may be implemented or rendered by the apparel fit app on a display screen via of a user computing device (e.g., user computing device 111c1). For example, as shown in the example of FIG. 3, GUI 300 may be implemented or rendered via a native app executing on user computing device 111c1. In the example of FIG. 3, user computing device 111c1 is a user computer device as described for FIG. 1, e.g., where 111c1 is illustrated as an APPLE IPHONE that implements the APPLE iOS operating system and that has a display screen. User computing device 111c1 may execute one or more native applications (apps) on its operating system, including, for example, the apparel fit app 108 as described herein. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, GUI 300 may be implemented or rendered via a web interface, such as via a web browser application, e.g., Safari and/or Google Chrome app(s), or other such web browser or the like.

FIG. 3 illustrates a user's sizing profile or otherwise user-specific measurements. The example of FIG. 3 may comprise a completed sizing profile, which may be based on one or more images as captured of the user. One such image may be image 202*a*, which depicts a front portion of a user.

As illustrated for FIG. 3, the user's sizing profile comprises user-specific measurements. These user-specific measurements include body measurements and apparel measurements of the user as determined from the one or more digital images (as described for the algorithm of digital imaging method 200). Such measurements and measurement values may include, as shown for GUI portions 304*a* and 304*b* of GUI 300, and by way of non-limiting example, a user's shoulder width (e.g., 17.8 inches), neck circumference (e.g., 15.64 inches), biceps circumference (e.g., 12.96 inches), thigh circumference (e.g., 24.16 inches), arms length (e.g., 25.8 inches), rise length (e.g., 8.0 inches), wrist circumference (e.g., 7.03 inches), upper hips circumference (e.g., 37.06 inches), lower hips circumference (e.g., 41.03 inches), calf circumference (e.g., 15.61 inches), inseam length (e.g., 32.69 inches), chest circumference (e.g., 41.39 inches), torso length (e.g., 23.66 inches), and waist circumference (e.g., 36.66 inches). It is to be understood, however, that addition and/or different measurements and measurement values for a user's user-specific measurements are contemplated herein, and each of which may be determined using the digital imaging systems and methods as described herein.

As described for FIG. 3, digital image 202*a* depicts a front portion of a user. In the example of FIG. 3, digital image 202*a* is represented as a 2D pixel based image. However, as described herein, digital image(s) may be captured in one or both of 2D and/or 3D images and used to determine the user's user-specific measurements. In various aspects, digital image 202*a* may each be digital images as captured by a digital camera or otherwise digital imaging capture devices, as described for FIG. 1. Digital image 202*a* may be transmitted to and from server(s) 102 via a user computer device (e.g., user computing devices 111c1), computer network 120, and base station 111b, as shown and described for FIG. 1.

In addition, in various aspects, a digital image (e.g., digital image 202a) may comprise pixel data (e.g., RGB data) comprising feature data and corresponding to one or more image features, within the respective image. The pixel data may be captured by an imaging device of one of the user computing devices (e.g., one or more user computer devices 111c1-111c3). For example, with respect to digital images as described herein, pixel data (e.g., pixel data of the digital image 202a) may comprise individual points or squares of data within an image, where each point or square represents a single pixel within an image. Each pixel may be at a specific location within an image. In addition, each pixel may have a specific color (or lack thereof). Pixel color, may be determined by a color format and related channel data associated with a given pixel. For example, one color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges. Further, it is to be understood that the pixel data may contain additional or alternative color format and channel data. For example, the pixel data may include color data expressed in a hue saturation value (HSV) format or hue saturation lightness (HSL) format.

As a whole, the various pixels, positioned together in a grid pattern form a digital image or portion thereof. A single digital image can comprise thousands or millions of pixels or channels. Images can be captured, generated, stored, and/or transmitted in a number of formats, such as JPEG, TIFF, PNG and GIF. These formats use pixels to store or represent the image.

With reference to FIG. 3, digital image 202a illustrates a user. Digital image may comprise a plurality of pixels. The pixel data, and features thereof, may body dimensions, sizes, apparel dimensions, etc. of the user that maybe be used to determine user-specific measurements. For example, pixels may define features determined from or otherwise based on one or more pixels in a digital image. For example, with respect to image 202a, pixels forming the user's arms may be used to determine arm circumference and those pixels that form the user's waist may determine waist circumference. The identified pixels may be determined as those pixels grouped together that form a shape of an arm or waist such that the apparel fit app may correctly scan and categorize each measurement. Moreover, an edge of a user's body may be determined by an abrupt change in RGB values indicating that the neighboring pixels belong to two different areas of the body. A collection of surface edges can be used to determine a body outline, and the position of those edges relative to other parts of the body can be used to determine which body part has been located (e.g., a finger should be attached to a hand, which should be attached to an arm, etc.). The capture and scanning of multiple images (e.g., a 360 view of the user for obtaining a plurality of images) can be used to enhance the accuracy of the user-specific measurements.

As further shown for FIG. 3, a user can select from GUI 300 to rescan 302 their body in order to generate new user-specific measurements. Similarly, as shown for GUI 300 a user may similarly select to update 306 the user-specific measurements. A rescan 302 may include a full scan for generation of all new user-specific measurements. An update 306 may include updating one or more user-specific measurements. For example, if a user clicks on rescan 302, apparel fit app may prompt the user with a series of screens with instructions on how to record a one or more digital images (e.g., a video) in order to correctly to obtain accurate user-specific measurements, as shown in FIG. 3 for GUI portions 304a and 304b of GUI 300.

In various aspects, the user-specific measurements may be rendered on GUI 300 in about 60 seconds (or less) after obtaining the digital images from the scan. In some aspects, a user may capture new digital images that may be transmitted to imaging server(s) 102 for determination and/or storage of user-specific measurements. In other aspects, the new digital images may be locally obtained by computing device 111c1 and analyzed for user-specific measurements on the computing device 111c1.

Figure 4:
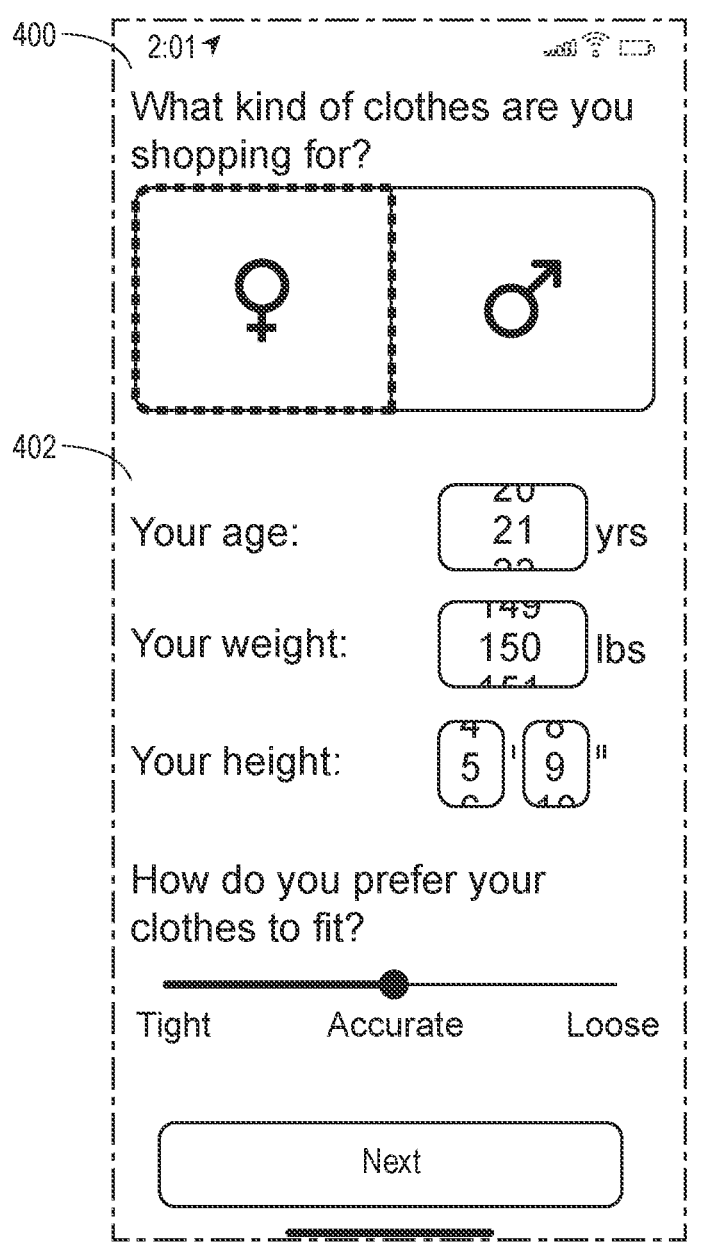

FIG. 4 illustrates an example graphic user interface (GUI) 400 as rendered on a display screen of a user computing device regarding apparel fit information in accordance with various aspects disclosed herein. GUI 400 may be implemented or rendered in the same manner as described herein for GUI 300 of FIG. 3, where, for example, the apparel fit app renders GUI 400 on a display screen via of a user computing device (e.g., user computing device 111c1).

As illustrated for FIG. 4, apparel fit information 402 comprises user specific information such as sex (e.g., male or female), age (e.g., 21 years old), weight (e.g., 150 lbs), and height information (e.g., 5 feet, 9 inches) specific to the user, as well as user preferences (e.g., fit preference information such as "tight," "accurate," and "loose").

Such information may be provided by the user and stored (e.g., on the memory of the user computing device) and/or server(s) 102. As shown, a user may provide his or her information via GUI 400, where the apparel fit app may ask for, by way of non-limiting example, any one or more name, email, sex, height, weight, etc. It is to be understood that additional or different apparel fit information may also be captured or entered. The apparel fit information may be combined with the digital images (e.g., digital image 202a) captured for the user as described herein, which allows determination of the user's body and/or apparel measurements for fitting apparel items specific to the user.

Figure 5:
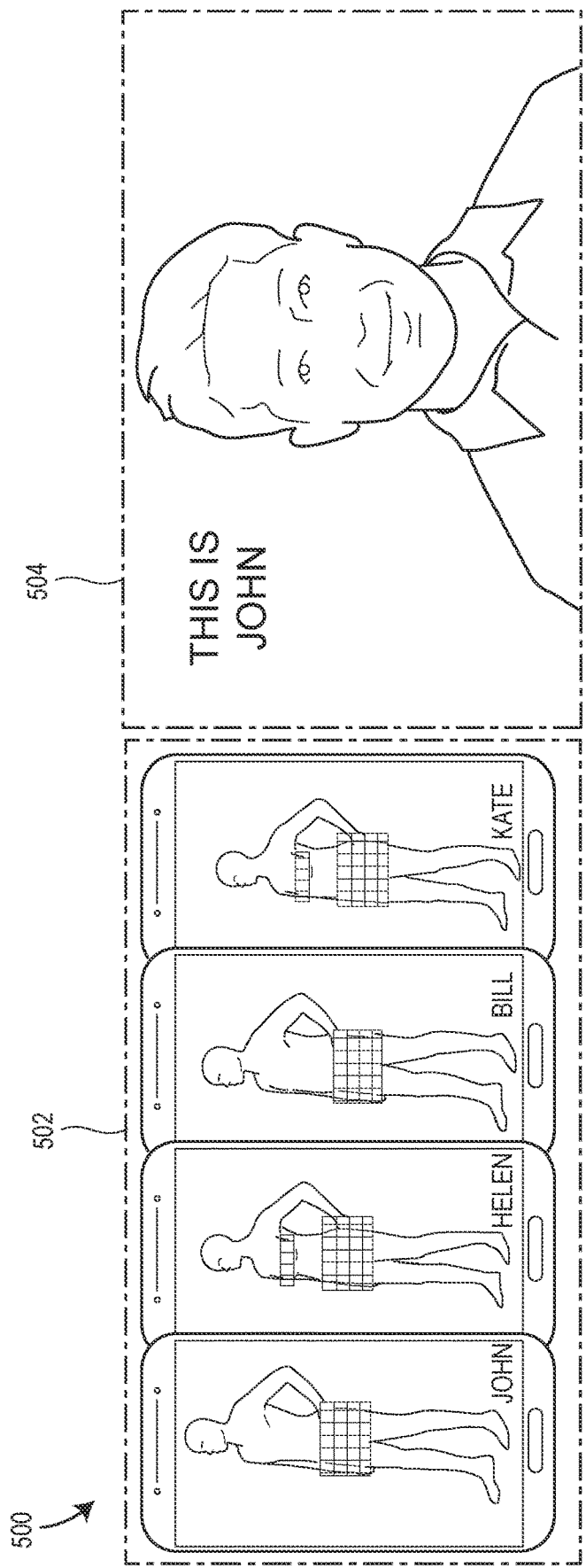
FIG. 5 illustrates an example graphic user interface (GUI) as rendered on a display screen of a user computing device regarding virtual avatar(s) in accordance with various aspects disclosed herein.

FIG. 5 illustrates an example graphic user interface (GUI) as rendered on a display screen of a user computing device regarding virtual avatar(s) 502 in accordance with various aspects disclosed herein. GUI 500 may be implemented or rendered in the same manner as described herein for GUI 300 of FIG. 3, where, for example, the apparel fit app renders GUI 500 on a display screen via of a user computing device (e.g., user computing device 111c1).

As shown for FIG. 5, GUI 500 may render a virtual avatar such as any of the virtual avatars 502 as shown, including a first virtual avatar ("John"), a second virtual avatar ("Helen"), a third virtual avatar ("Bill"), and a fourth virtual avatar ("Kate"). A virtual avatar may be referred to a "TAV" herein, and it is to be understood that additional and/or different avatars may be generated, one for a given, specific user. That is, each of the virtual avatars 502 may represent different users and their respective measurements as determined by the digital imaging systems and methods as described herein. That is, from the user's respective sizing profile and body measurements (e.g., user-specific measurements), a unique avatar may be generated representing their physique, allowing the user to virtually try on different outfits, clothing, and/or other apparel items. In some aspects, a user's unique avatar can be unisex. In some aspects, as shown for virtual avatars 504, the private or personal areas of the user maybe blurred, cropped, or obscured, e.g., for security reasons.

In other aspects, the user's virtual avatar can be rendered as a realistic avatar 504 (e.g., "John"), detailing the actual user in virtual space in order to provide an enhanced degree of detail and replication for virtually fitting virtual apparel items. In some examples, once an item of clothing is selected, a user then has the option to try on this article of clothing, simultaneously with other interested apparel items, displaying a realistic outfit, drape, and style of the garment imposed on a realistic avatar of the user. Such realistic rendering provides enhanced detail with respect to a realistic approach of the apparel item including how the article of clothing fits/drapes on the avatar representing the scanned user. In this way, the apparel fit app is able to simulate movement or appearance of the user moving around and being active in the apparel item so they can get a realistic sense of how the apparel item would look, feel, and/or otherwise fit on their person in the event the user tried on the physical item in real life.

As illustrated for FIG. 5, in various aspects, a virtual avatar (e.g., any one of virtual avatars 502) may be generated for a user based on the user's user-specific measurements. The virtual avatar may be configured to depict a fit of an apparel item (e.g., a shirt as shown for virtual avatar 504) to one or more portions of the virtual avatar's body (e.g., upper body for virtual avatar 504) corresponding to the one or more portions of the user's body in real life.

In some aspects, a virtual avatar may be generated for a user, as described herein, at a first time. A second virtual avatar may then be generated for the user at a second time. Each virtual avatar for the user may be based on the user-specific measurements at the first time and second time, respectively. The apparel fit app or otherwise instructions operating at server(s) 102 may compare the second virtual avatar generated at the second time to the first virtual avatar captured at the first time to determine a fitness status of the user. In this way, the digital systems and methods herein may be used for fitness tracking, e.g., tracking fitness goals based on virtual avatar differences. That is, the comparison comprises scanning a user's body at the first time and the second time, where the comparison shows or demonstrates, for example, differences in body size and/or mass between the first and second time allowing for fitness tracking of the user.

Figure 6:
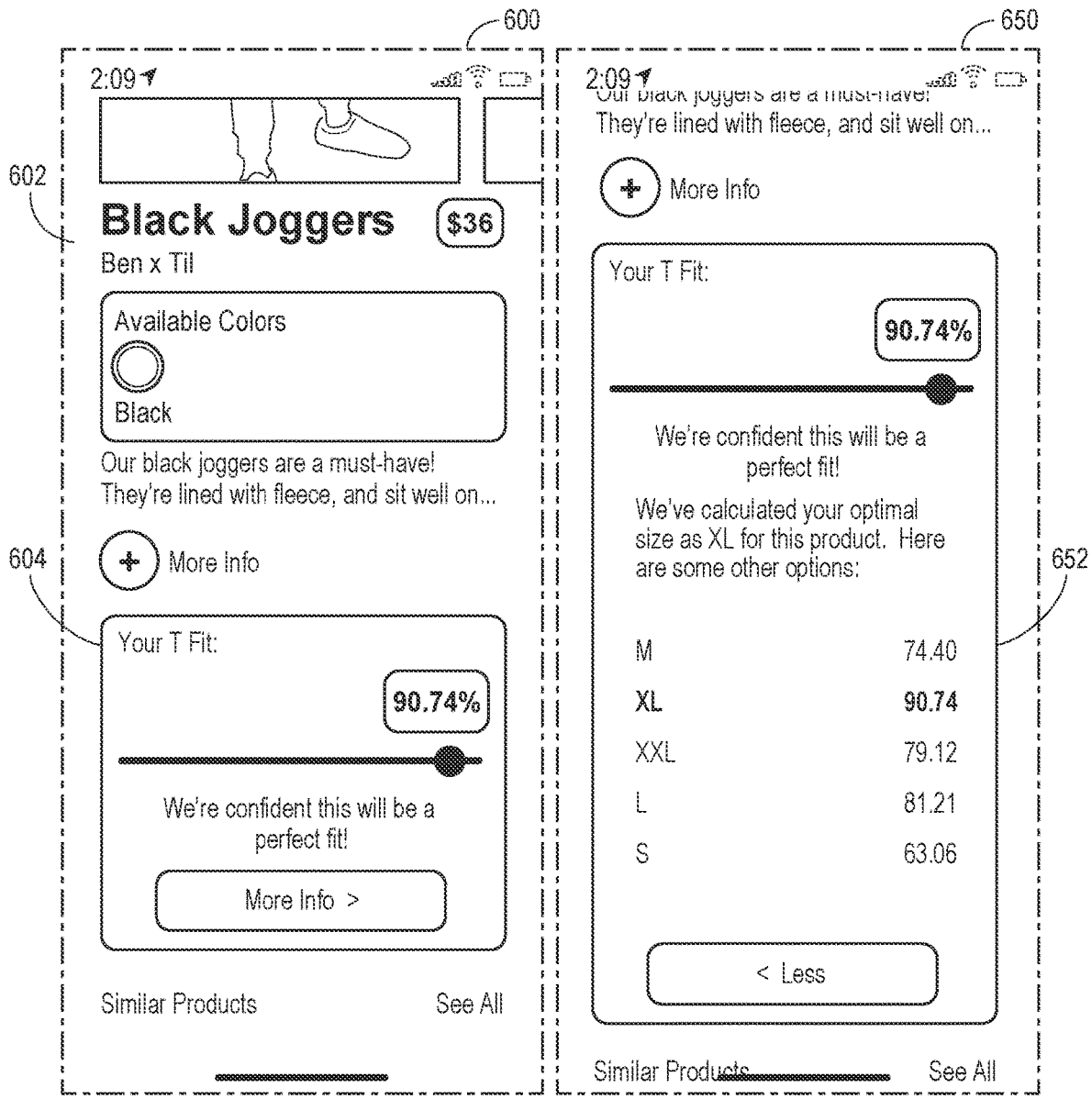
FIG. 6 illustrates an example graphic user interface (GUI) as rendered on a display screen of a user computing device regarding a user-specific fit-based confidence interval in accordance with various aspects disclosed herein.

FIG. 6 illustrates an example graphic user interface (GUI) as rendered on a display screen of a user computing device regarding a user-specific fit-based confidence interval in accordance with various aspects disclosed herein. GUI 600 may be implemented or rendered in the same manner as described herein for GUI 300 of FIG. 3, where, for example, the apparel fit app renders GUI 600 on a display screen via of a user computing device (e.g., user computing device 111c1).

As shown for FIG. 6, a user-specific fit-based confidence interval 652 is shown for a specific apparel item 602. In the example of FIG. 6, apparel item 602 is shown as black joggers pants sold under the brand "Ben X Til" for 36 dollars.

In some aspects, a user may be recommended products (e.g., apparel item 602) based on their user-specific fit-based confidence interval (i.e., their "T Fit" as referred to herein). In other aspects, a user can select a given product (e.g., apparel item 602) and where a user-specific fit-based confidence interval ("T Fit") for the given product may be displayed.

In various aspects, a user-specific fit-based confidence interval ("T Fit") is a confidence interval from 0-100%, which informs a user of how well a clothing item or accessory (e.g., an apparel item, such as apparel item 602) will fit. A score of 100% is of utmost confidence for a perfect fit. A score of 0% represents no confidence. The percentage scores of a user-specific fit-based confidence interval ("T Fit") are generated by comparing the user's user-specific measurements (from the user's sizing profile) and apparel fit information with manufacturing data of the product (e.g., apparel item 602). The user-specific fit-based confidence interval ("T Fit") may also be based on selections of the user regarding one or more of preference of fit (e.g., loose), preference of style, and/or feedback of one or more previously purchased items (e.g., liked or disliked a particular brand or type of material). Based on this information, the user-specific fit-based confidence interval ("T Fit") is generated to indicate how well a garment (e.g., apparel item 602) will fit a user. In this way, the user-specific fit-based confidence interval ("T Fit") establishes a universal sizing approach where the fit of clothes or other apparel items is based on the user's dimensions and not merely on the intricacies of sizing labels which varies from brand to brand. For each labeled size in a particular garment or apparel item, the user-specific fit-based confidence interval ("T Fit") outputs objective sizing (e.g., objective to the user's dimensions) of how accurately the piece of clothing, or otherwise an apparel item, will fit a user according to their preferences and physical dimensions. This enables informed decision making while shopping online or in virtual environments.

As shown in the example of FIG. 6, user-specific fit-based confidence interval 652 ("Your T Fit") is rendered on GUI 600 for apparel item 602. As shown, user-specific fit-based confidence interval 652 indicates that there is a 90.74% chance that the extra-large (XL) size fits the user. This prediction is made on the user's user-specific measurements and apparel fit information as provided by the user and/or as captured by the digital imaging systems and methods as described herein. As further shown, user-specific fit-based confidence interval 652 is spread across various sizes (e.g., small(S), medium (M), large (L), extra-extra-large (XXL)) for the same apparel item 602 at different percentage values, but where the XL size has the highest value compared to any of the others. Accordingly, the XL size for the user in this example is designated as the matching fit size ("Your T Fit") for this specific product given its manufacturing dimensions compared to the user's specific dimensions and information as provided by the user's user-specific measurements and the apparel fit information as described herein.

In some aspects, GUI 600 may be configured to receive a selection to purchase an apparel item (e.g., apparel item 602) identified based on the user-specific fit-based confidence interval. For example, a user may check out directly from the app and/or purchase the apparel item (e.g., apparel item 602) that they know will fit their exact body measurements, and which they may have virtually tried on with great attention to detail to fabrication and fit, as described herein for FIGS. 5 and 6.

Figure 7A:
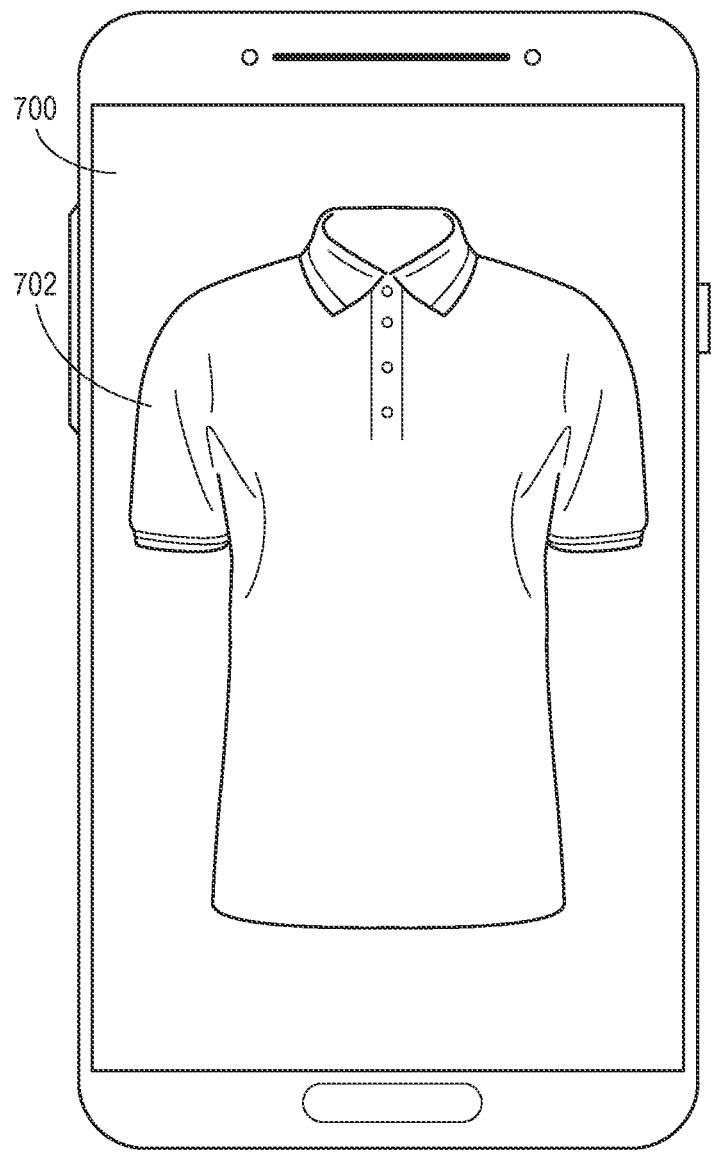
FIG. 7A illustrates an example graphic user interface (GUI) as rendered on a display screen of a user computing device regarding an apparel item in accordance with various aspects disclosed herein.

FIG. 7A illustrates an example graphic user interface (GUI) 700 as rendered on a display screen of a user computing device regarding an apparel item in accordance with various aspects disclosed herein. GUI 700 may be implemented or rendered in the same manner as described herein for GUI 300 of FIG. 3, where, for example, the apparel fit app renders GUI 700 on a display screen via of a user computing device (e.g., user computing device 111c1).

FIG. 7A depicts a rendering of a garment 702 (e.g. a shirt), which may be a 3D rendering. In various aspects, garment 702 may comprise a realistic and accurately detailed virtual rendering of apparel item (i.e., a virtual apparel item). Such garments (e.g., garment 702) may be used during virtual try-ons and/or for placement in media environments, as further described, for example with respect to FIGS. 5 and 7B herein.

Figure 7B:
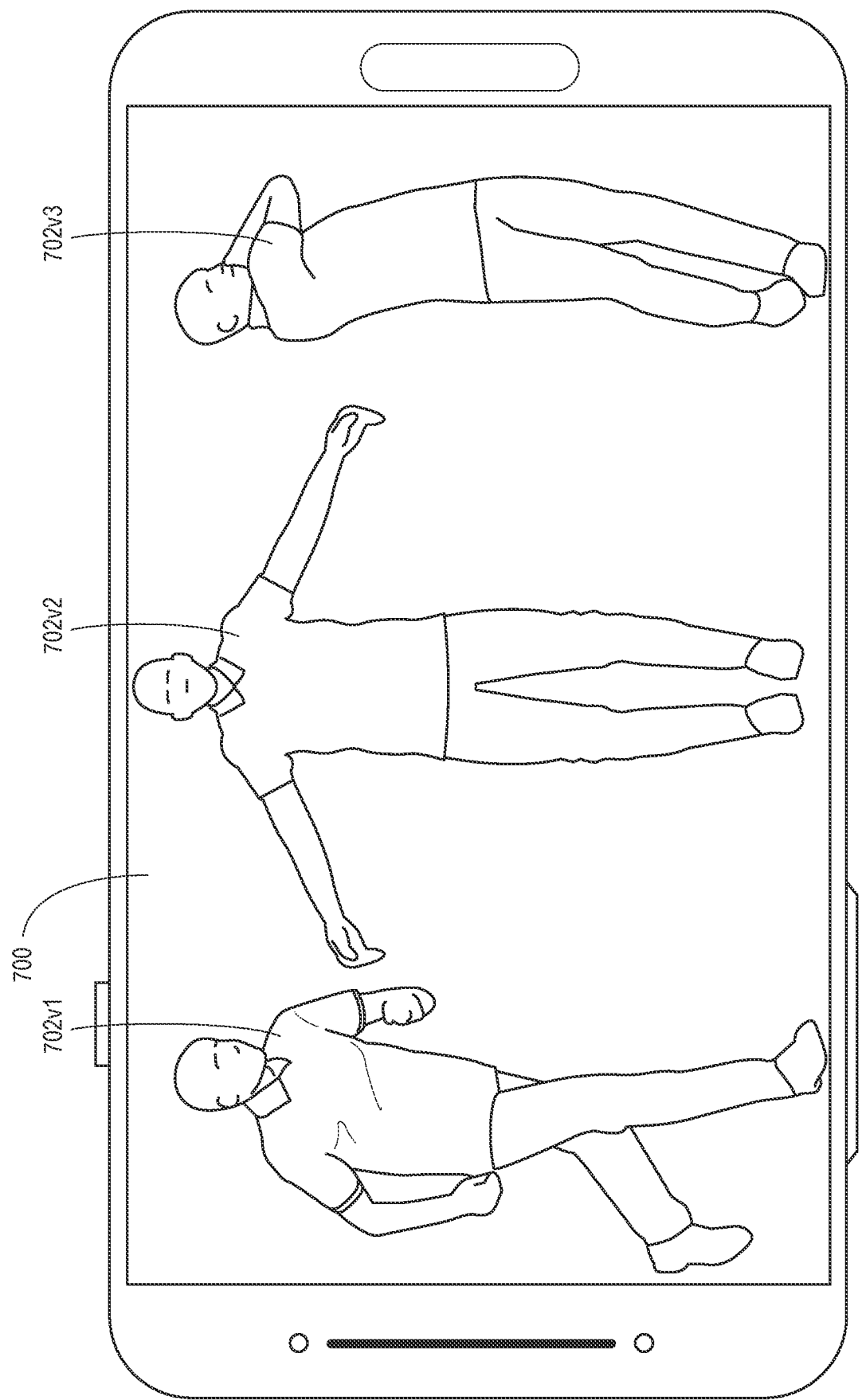
FIG. 7B illustrates an example graphic user interface (GUI) as rendered on a display screen of a user computing device regarding an apparel item in a media environment in accordance with various aspects disclosed herein.

FIG. 7B illustrates the example graphic user interface (GUI) 700, as described for FIG. 7B, and as rendered on a display screen of a user computing device (e.g., computing device 111c1) regarding an apparel item in a media environment in accordance with various aspects disclosed herein.

As shown for FIG. 7B, a virtual avatar (e.g., any one of virtual avatars 702v1, 702v2, and/or 702v3) is rendered as a representation of the user. The virtual avatar may be rendered as described herein for FIG. 5, where the virtual avatar is based on a user's user-specific measurements and/or apparel fit information. A virtual apparel item (e.g., such garment 702) may be depicted as a realistic representation of the apparel item fitted to the virtual avatar.

In some aspects, a virtual avatar (e.g., any one virtual avatars 702v1, 702v2, and/or 702v3) and/or an apparel item (e.g., garment 702) may be rendered in or as part of a media environment. For example, as shown in FIG. 7B, an apparel item (e.g., garment 702) is shown rendered on virtual avatars 702v1, 702v2, and/or 702v3 in a variety of activities, including jogging (virtual avatar 702v1), jumping (virtual avatar 702v2), and golfing (virtual avatar 702v3). As shown, the virtual avatars may be manipulated in virtual space for the placement in media environments. A media environment may include, by non-limiting example, a video game or movie or other media having a graphical background or setting. For example, the digital imaging systems and methods may size a virtual avatar and/or virtual apparel item via photogrammetry in order to place the virtual avatars as video game assets and/or CGI models in video games, motion picture films, TV, and/or otherwise media or animation environments.

In still further aspects, an apparel item (e.g., garment 702) may be virtually rendered within the media environment as a different version of the apparel item depicted as updated, altered, and/or reconstructed. This can be used to reconstruct or modify garments, such as ancient garments, which may be used in media entertainment for film, media, video gaming, and the digitization of museum and archival outfits/costumes.

Such techniques may also be used to create new or reconstruct ancient garments (e.g., applying apparel fit and digital imaging systems and methods as described herein to generate a virtually rendered CGI character for applying an ancient garment such as a coat of armor, etc. to). Moreover, such avatars may be integrated in different media environments such as movie, video games, texting, via platforms (e.g., such as the Spotify platform,) and the like. Such avatars may further be used for hosting virtual events as the user's avatar.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A digital imaging method for detecting user-specific apparel fit, the digital imaging method comprising:
    obtaining, by one or more processors, one or more digital images of a user, each of the one or more digital images comprising pixel data depicting one or more portions of the user's body;
    obtaining, by the one or more processors, apparel fit information specific to the user;
    determining, by an apparel fit application (app) executing on the one or more processors, user-specific measurements of the one or more portions of the user's body based on the pixel data of the one or more digital images defining edges of the user's body detectable as changes within neighboring pixels of the pixel data belonging to different areas of the user's body;
    determining, by the apparel fit app, a user-specific fit-based confidence interval for the user, the user-specific fit-based confidence interval based on the user-specific measurements determined from the pixel data of the one or more digital images and the apparel fit information;
    generating, by the one or more processors, a fit based identification of an apparel item that corresponds to the user-specific fit-based confidence interval;
    generating, by the one or more processors, a virtual avatar for the user based on the user-specific measurements, the virtual avatar configured to depict a fit of the apparel item to one or more portions of the virtual avatar's body corresponding to the one or more portions of the user's body, wherein the virtual avatar is generated at a first time;
    generating, by the one or more processors, a second virtual avatar for the user based on the user-specific measurements determined from the pixel data of the one or more digital images at the second time; and
    comparing, by the one or more processors, the second virtual avatar generated at the second time to virtual avatar captured at the first time to determine a fitness status of the user.

2. The digital imaging method of claim 1 further comprising:
    generating a user profile of the user based on the one or more digital images and the apparel fit information of the user.

3. The digital imaging method of claim 2 further comprising:
    electronically transmitting the user profile to a second user, the user profile allowing the second user to identify apparel for the user.

4. The digital imaging method of claim 1, wherein the virtual avatar is rendered as a representation of the user, and wherein the apparel item is depicted as a realistic representation of the apparel item fitted to the virtual avatar.

5. The digital imaging method of claim 4 further comprising:
    rendering at least one of the virtual avatar or the apparel item in a media environment.

6. The digital imaging method of claim 5 further comprising:
    updating, altering, or reconstructing the apparel item as virtually rendered within the media environment.

7. The digital imaging method of claim 1, wherein the user-specific fit-based confidence interval is further based on selections of the user regarding one or more of: preference of fit, preference of style, or feedback of one or more previously purchased items.

8. The digital imaging method of claim 1, wherein the apparel item as identified is based on a search for an apparel item type.

9. The digital imaging method of claim 1 further comprising:
    receiving a selection to purchase the apparel item identified based on the user-specific fit-based confidence interval.

10. A digital imaging system configured to detect user-specific apparel fit, the digital imaging system comprising:
    an apparel fit application (app) comprising computing instructions configured to execute on the one or more processors,
    wherein the computing instructions of the apparel fit app when executed by the one or more processors, cause the one or more processors to:

obtain one or more digital images of a user, each of the one or more digital images comprising pixel data depicting one or more portions of the user's body, obtain apparel fit information specific to the user, determine user-specific measurements of the one or more portions of the user's body based on the pixel data of the one or more digital images defining edges of the user's body detectable as changes of neighboring pixels within the pixel data belonging to different areas of the user's body, determine a user-specific fit-based confidence interval for the user, the user-specific fit-based confidence interval based on the user-specific measurements determined from the pixel data of the one or more digital images and the apparel fit information, generate a fit based identification of an apparel item that corresponds to the user-specific fit-based confidence interval, generate a virtual avatar for the user based on the user-specific measurements, the virtual avatar configured to depict a fit of the apparel item to one or more portions of the virtual avatar's body corresponding to the one or more portions of the user's body, wherein the virtual avatar is generated at a first time;

generate a second virtual avatar for the user based on the user-specific measurements determined from the pixel data of the one or more digital images at the second time; and compare the second virtual avatar generated at the second time to virtual avatar captured at the first time to determine a fitness status of the user.

11. The digital imaging system of claim 10, wherein the computing instructions of the apparel fit app when executed by the one or more processors, further cause the one or more processors to:

generate a user profile of the user based on the one or more digital images and the apparel fit information of the user.

12. The digital imaging system of claim 11, wherein the computing instructions of the apparel fit app when executed by the one or more processors, further cause the one or more processors to:

electronically transmit the user profile to a second user, the user profile allowing the second user to identify apparel for the user.

13. The digital imaging system of claim 10, wherein the computing instructions of the apparel fit app when executed by the one or more processors, further cause the one or more processors to:

generate a virtual avatar for the user based on the user-specific measurements, the virtual avatar configured to depict a fit of the apparel item to one or more portions of the virtual avatar's body corresponding to the one or more portions of the user's body.

14. The digital imaging system of claim 13, wherein the virtual avatar is rendered as a representation of the user, and wherein the apparel item is depicted as a realistic representation of the apparel item fitted to the virtual avatar.

15. The digital imaging system of claim 14, wherein the computing instructions of the apparel fit app when executed by the one or more processors, further cause the one or more processors to:

render at least one of the virtual avatar or the apparel item in a media environment.

16. The digital imaging system of claim 15, wherein the computing instructions of the apparel fit app when executed by the one or more processors, further cause the one or more processors to:

update, altering, or reconstructing the apparel item as virtually rendered within the media environment.

17. The digital imaging system of claim 10, wherein the user-specific fit-based confidence interval is further based on selections of the user regarding one or more of: preference of fit, preference of style, or feedback of one or more previously purchased items.

18. The digital imaging system of claim 10, wherein the apparel item as identified is based on a search for an apparel item type.

19. A tangible, non-transitory computer-readable medium storing instructions for detecting user-specific apparel fit, that when executed by one or more processors cause the one or more processors to:

obtain one or more digital images of a user, each of the one or more digital images comprising pixel data depicting one or more portions of the user's body;

obtain apparel fit information specific to the user;

determine user-specific measurements of the one or more portions of the user's body based on the pixel data of the one or more digital images defining edges of the user's body detectable as changes within neighboring pixels of the pixel data belonging to different areas of the user's body;

determine a user-specific fit-based confidence interval for the user, the user-specific fit-based confidence interval based on the user-specific measurements determined from the pixel data of the one or more digital images and the apparel fit information;

generate a fit based identification of an apparel item that corresponds to the user-specific fit-based confidence interval;

generate a virtual avatar for the user based on the user-specific measurements, the virtual avatar configured to depict a fit of the apparel item to one or more portions of the virtual avatar's body corresponding to the one or more portions of the user's body, wherein the virtual avatar is generated at a first time;

generate a second virtual avatar for the user based on the user-specific measurements determined from the pixel data of the one or more digital images at the second time; and compare the second virtual avatar generated at the second time to virtual avatar captured at the first time to determine a fitness status of the user.

* * * * *